No. 737,824. PATENTED SEPT. 1, 1903.
T. L. CARBONE.
ELECTRIC ARC LAMP.
APPLICATION FILED JAN. 6, 1903.
NO MODEL. 2 SHEETS—SHEET 1.
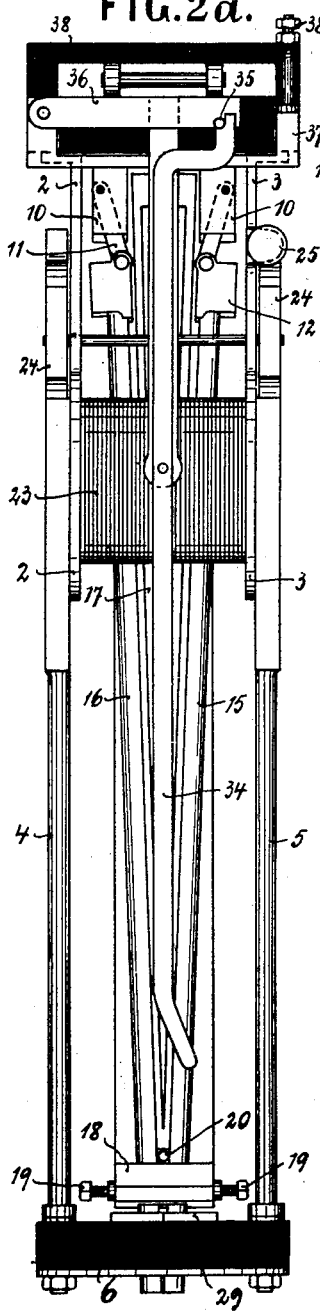
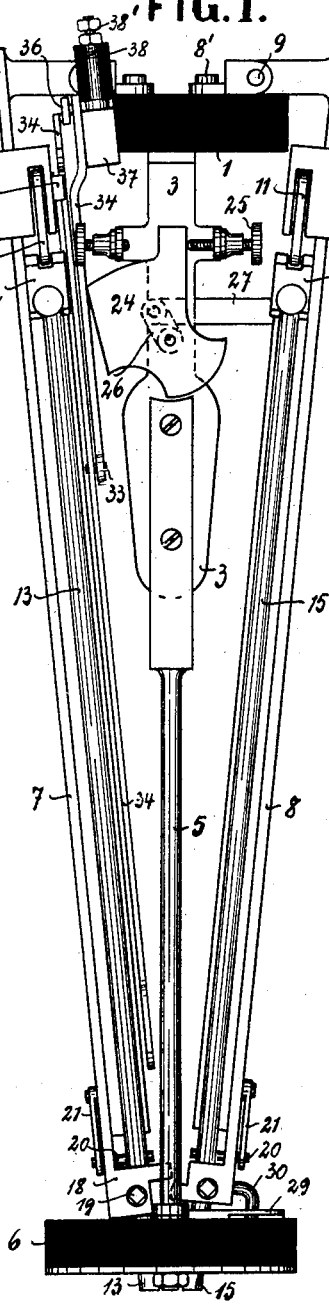
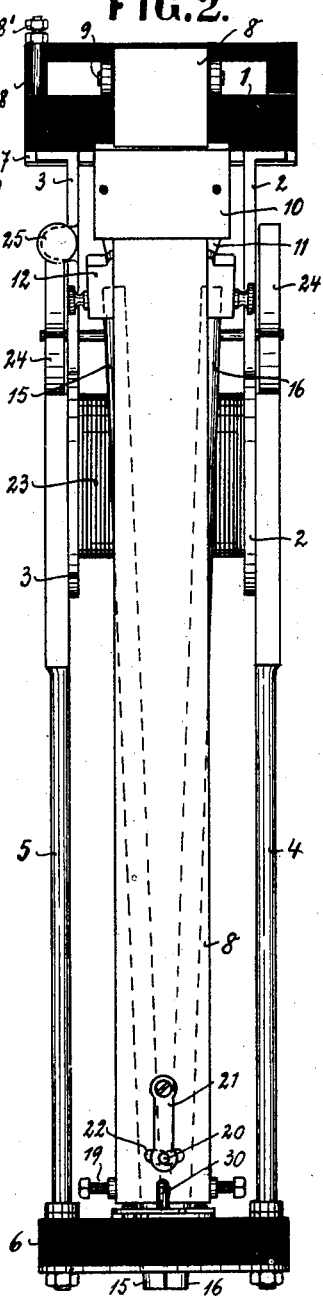
WITNESSES
A. W. White
John G. Percival
INVENTOR
Tito L. Carbone
By Richardson
ATTORNEYS No. 737,824. PATENTED SEPT. 1, 1903.
T. L. CARBONE.
ELECTRIC ARC LAMP.
APPLICATION FILED JAN. 6, 1903.
NO MODEL. 2 SHEETS—SHEET 2.
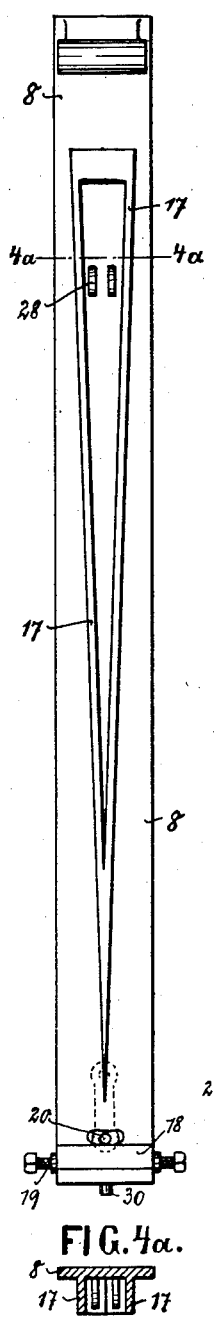
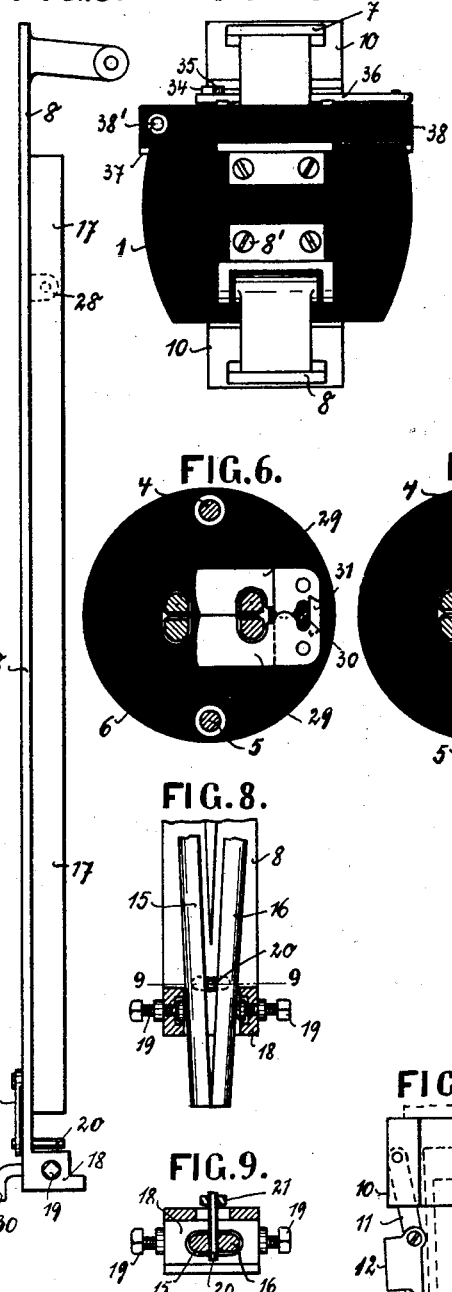
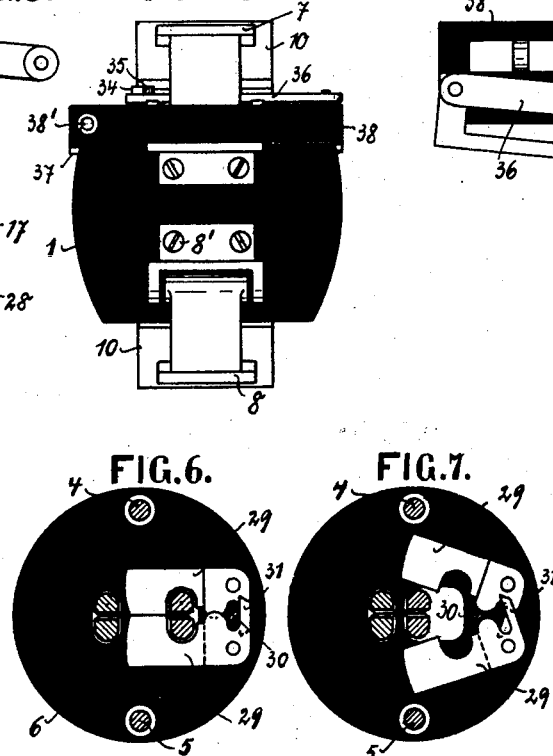
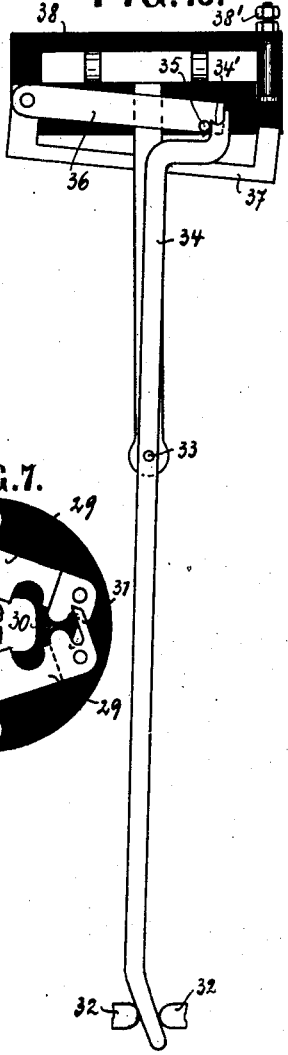
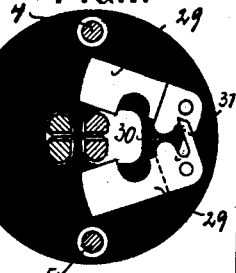
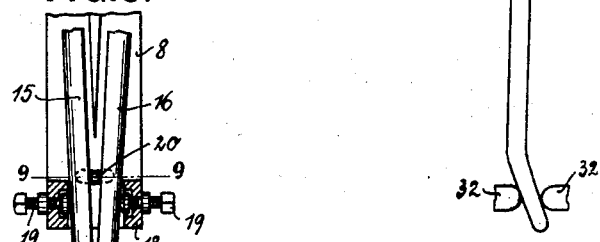
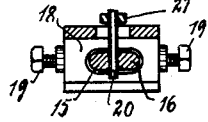
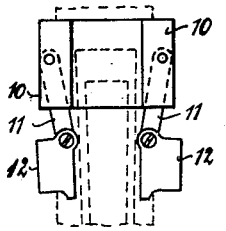
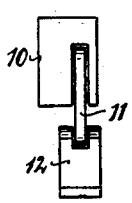
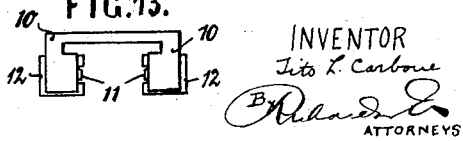
WITNESSES
INVENTOR
Tito L. Carbone
ATTORNEYS No. 737,824.

Patented September 1, 1903.

UNITED STATES PATENT OFFICE.

TITO LIVIO CARBONE, OF GRUNEWALD, NEAR BERLIN, GERMANY.

ELECTRIC-ARC LAMP.

SPECIFICATION forming part of Letters Patent No. 737,824, dated September 1, 1903.

Application filed January 6, 1903. Serial No. 138,041. (No model.)

*To all whom it may concern:*

Be it known that I, TITO LIVIO CARBONE, a subject of the King of Italy, residing at Grunewald, near Berlin, in the Kingdom of Prussia, German Empire, have invented certain new and useful Improvements in Arc-Lamps; and I do hereby declare that the following is a full, clear, and exact description.

The present invention relates to an arc-lamp with electrodes inclined to each other at an acute angle, each electrode consisting of two carbon rods which are also inclined to each other at an acute angle.

In the new arc-lamp the lower ends of the carbon rods of each electrode are guided together by a suitable guiding-plate, the carbon rods being suspended by means of link-arms on a sliding plate which is guided in the direction of the electrodes, while the upper ends are always guided in the same inclination by means of clamps suspended on the said link-arms and by means of a support provided with a wedge-shaped projection. This arrangement has the object of obtaining an automatic feed of the electrodes as they burn up without using a separate regulating device. The support of one electrode is rigidly arranged, while the support of the other electrode is journaled to the carrier-plate in order to have a slight rocking movement.

The new arc-lamp is shown on the drawings.

Figure 1 shows the lamp in front view. Fig. 2 is an end view seen from the right side. Fig. 2ª is an end view seen from the left side, the rigid support having been removed for the purpose of showing the inner parts. Fig. 3 is a plan view corresponding to Fig. 1. Fig. 4 shows the rocking support in front view. Fig. 4ª is a section on line 4ª 4ª in Fig. 4. Fig. 5 is the end view corresponding to Fig. 4. Fig. 6 is a section on 6 6 in Fig. 1. Fig. 7 corresponds to Fig. 6, the plates having been shifted from one another. Fig. 8 shows the undermost part of two carbon rods and their support, partly in section. Fig. 9 is a section on 9 9 in Fig. 8. Fig. 10 shows the device for cutting off the lamp from the circuit after the carbons have been consumed. Fig. 11 shows a sliding piece with its link-arms and the clamps for the corresponding carbon rods which form one electrode. Fig. 12 is the corresponding end view. Fig. 13 is the corresponding plan view.

Two angle-pieces 2 3 project from the insulating carrier-plate 1, serving as a support for the lamp. Two iron rods 4 5 are fastened on these angle-pieces, the rods carrying the base-plate 6, also made from insulating material. Between the carrier-plate 1 and the base-plate 6 a support 7 is rigidly arranged at the same inclination as the electrode. Facing this support 7 there is arranged another support 8 at the inclination of the other electrode, which is journaled at 9 on the carrier-plate 1, so that it can have a slight rocking movement. On said supports 7 and 8, inclined in the direction of the electrodes, sliding pieces 10 are arranged adapted to surround the edges of their corresponding supports in order to be securely guided, and that with only a slight friction. Clamps 12 are hung on the sliding pieces 10 by means of link-arms 11, the said clamps holding the carbon rods. The carbon rods 13 14 form the one and the carbon rods 15 16 the other electrode.

Each support 7 and 8 has a wedge-shaped projection 17, the edge being below and the back being above. (See Figs. 4 and 5.) The carbon-clamps 12 are freely suspended to the sliding plate 10 by the link-arms 11 in such a manner that they may slide with their rounded edge 12′ on the side faces of the wedge-shaped projection 17. The clamps 12 carry the carbon rods 13, 14, 15, and 16, respectively. The lower ends of the two carbon rods, which form one electrode, pass through the foot 18 of the support 7 and 8, respectively. By means of adjustable set-screws 19 the lower ends of two corresponding carbon rods are brought together, while the rounded edges 12′ of the clamps 12 rest on the side faces of the wedge-shaped projection 17. A pin 20 is revolubly mounted on each support 7 and 8 by means of an arm 21, so that it may be laterally shifted a little in a slot 22 of the support 7 and 8, respectively. The pin 20, provided between the two carbon rods of each electrode, prevents the carbon rods from being bent by the weight of the sliding piece 10, and, further, a sure guiding of the carbon rods is secured, since the pin may be easily moved from one side to the other if the carbons are uneven.

The coil 23, carried by the angle-pieces 2 3, serves for the production of the arc, the armature 24 of the coil 23 being attracted against the momentum of its own weight when a current passes through the coil. The movement of the armature 24, which can be regulated exactly by means of screws 25, operates on the support 8 by means of an arm 26, rigidly connected with the armature, and a link-arm 37, attached to ears 28 of the support 8. When current thus passes through the coil 23, the electrode which consists of the carbon rods 15 16 and before rested against the carbon rods 13 14 of the other electrode moves to such a distance that an arc of the desired length is formed. In the measure of their consumption the carbon rods sink down, because the sliding plates 10 and the clamps 12 find only a very slight frictional resistance on the corresponding support and because the link-arms 11 and clamps 12 admit a light movement of the carbon rods in their proper direction. The base-plate 6 must, of course, be provided with a larger aperture for the movement of the movable carbon rods 15 16. While the lamp is burning this aperture of the base-plate 6 is closed by two plates 29, having notches corresponding to the carbon rods 15 16. These plates 29 are pivoted on the base-plate 6 and are cut out on their facing edges in such a way that said plates are closed and opened apart automatically by a pin 30, fixed on the lower end of the swiveling supports 8. As long as the lamp is not lighted the carbon rods 15 16 of one electrode bear against the carbon rods 13 14 of the other electrode, and the said pin 30 keeps the two plates 29 apart. When, however, the coil 23 moves the swiveling support 8, the said pin 30 strikes against projections 31 of the plates 29 and closes them.

In order to cut off the current of the lamp as soon as the carbons are completely burned out, the following arrangement is provided: Two projections 32 are provided on one of the sliding pieces 10, which bear from both sides against a lever 34, pivoted at 33. As soon as the carbons are completely burned out the projections 32 bear against the lower end of the lever 34, so that the latter is shifted laterally in the position shown by dotted lines, Fig. 10. By this arrangement the pin 35, resting in a notch on the upper edge of the lever 34, is released, so that an arm 36, carrying the pin 35, falls and moves the movable part 37 of a switch mounted to the arm 36. If the pin 35 rests in the notch 34' of the lever 34, the movable part 37 is in contact with the rigid part 38 of the switch. The rigid part 38, of insulating material, is provided with the contact-screw 38', to which is connected the one pole of the source of electricity, whose other pole is connected to the screw 8' of the rocking support 8. The coil 23 may be connected in a shunt to the main current at 37 and 8'. If desired, the coil 23 may be connected in series to the main current.

Having now described my invention and in what manner the same is to be performed, what I claim, and desire to secure by Letters Patent, is—

1. In arc-lamps, the electrodes of which are inclined together at an acute angle, each electrode consisting of two carbon rods also inclined together at an acute angle, the combination of sliding plates, link-arms and clamps for supporting the carbon rods, with supports provided with a wedge-shaped projection and means for guiding the lower ends of said carbons, substantially as shown and described.

2. In arc-lamps, the electrodes of which are inclined together at an acute angle, each electrode consisting of two carbon rods also inclined together at an acute angle, the combination of sliding plates, link-arms and clamps for supporting the carbon rods, with supports provided with a wedge-shaped projection, one support being fixed and the other pivoted to the frame-plate and adapted to be rocked by an arc-starting coil, and means for guiding the lower ends of said carbons, substantially as shown and described.

3. In arc-lamps, the electrodes of which are inclined together at an acute angle, each electrode consisting of two carbon rods also inclined together at an acute angle, the combination of sliding plates, link-arms and clamps for supporting the carbon rods, with supports provided with a wedge-shaped projection, a movable pin and set-screws for guiding the lower ends of said carbons, substantially as shown and described.

4. In arc-lamps the electrodes of which are inclined together at an acute angle, each electrode consisting of two carbon rods also inclined together at an acute angle, the combination of sliding plates, link-arms, clamps for supporting the carbon rods, supports guiding said clamps and means for guiding the lower ends of the carbons, with a device for short-circuiting the lamp, after the carbons are consumed, consisting in two projections of one sliding plate and a pivoted lever, shifted laterally by said projections in their undermost position, substantially as shown and described.

In witness whereof I have hereunto set my hand in presence of two witnesses.

TITO LIVIO CARBONE.

Witnesses:
 WOLDEMAR HAUPT,
 HENRY HASPER.